US009186300B2

(12) United States Patent
Young et al.

(10) Patent No.: US 9,186,300 B2
(45) Date of Patent: Nov. 17, 2015

(54) SYSTEMS AND METHODS FOR PREPARATION OF MEDICATIONS

(71) Applicant: Kinn, Inc., Aliso Viejo, CA (US)

(72) Inventors: Allen Chandler Young, Encinitas, CA (US); Chi Hung Cao, San Diego, CA (US); Alexander James McKinnon, Aliso Viejo, CA (US)

(73) Assignee: Kinn, Inc., Aliso Viejo, CA (US)

( * ) Notice: Subject to any disclaimer, the term of this patent is extended or adjusted under 35 U.S.C. 154(b) by 0 days.

(21) Appl. No.: 14/275,782

(22) Filed: May 12, 2014

(65) Prior Publication Data

US 2014/0246525 A1 Sep. 4, 2014

Related U.S. Application Data

(62) Division of application No. 13/554,096, filed on Jul. 20, 2012, now Pat. No. 8,720,808.

(51) Int. Cl.

*A47J 43/00* (2006.01)
*A61J 7/00* (2006.01)
*B02C 19/08* (2006.01)

(52) U.S. Cl.

CPC ............... *A61J 7/0007* (2013.01); *B02C 19/08* (2013.01); *Y10T 83/04* (2015.04); *Y10T 225/10* (2015.04)

(58) Field of Classification Search

CPC ........... A61J 7/00; A61J 7/0007; B02C 19/08
USPC ................... 241/169, DIG. 27, 169.2; 30/124
See application file for complete search history.

(56) References Cited

U.S. PATENT DOCUMENTS

| | | | | |
|---|---|---|---|---|
| 3,915,393 | A | 10/1975 | Elkins | |
| 4,003,523 | A * | 1/1977 | Doolittle | 241/169.2 |
| 4,209,136 | A * | 6/1980 | Linden et al. | 241/169.2 |
| 5,118,021 | A | 6/1992 | Fiocchi | |
| 5,823,451 | A | 10/1998 | Sharpe | |
| 5,863,001 | A | 1/1999 | Schulze | |
| 5,915,637 | A | 6/1999 | Parsons | |
| 6,637,683 | B1 | 10/2003 | Wilbur | |
| 6,966,509 | B2 * | 11/2005 | Janzen | 241/169 |
| 7,243,826 | B2 | 7/2007 | Darst | |
| 7,252,254 | B1 * | 8/2007 | Engel et al. | 241/168 |
| 7,347,394 | B2 | 3/2008 | Buckley | |
| 7,637,449 | B1 | 12/2009 | Leyshon et al. | |
| 7,735,763 | B2 * | 6/2010 | Bell et al. | 241/169.1 |
| 7,845,588 | B1 | 12/2010 | Goodick | |
| 8,720,808 | B2 * | 5/2014 | Young et al. | 241/169.2 |
| 2005/0067452 | A1 | 3/2005 | Darst | |

(Continued)

FOREIGN PATENT DOCUMENTS

| | | |
|---|---|---|
| EP | 1667629 | 12/2010 |
| WO | 2005030117 | 4/2005 |
| WO | 2007084554 | 7/2007 |

*Primary Examiner* — Faye Francis
(74) *Attorney, Agent, or Firm* — Fish & Tsang LLP

(57) ABSTRACT

A pill is divided using a pill splitter and crusher device having a first member coupled to a second member. The first member includes a pill-receiving cavity and the second member comprises a blade and an anvil. In some contemplated embodiments, the anvil is configured to crush a pill placed within the cavity and the blade is configured to split the pill within the cavity. Furthermore, the anvil is coupled to the second member, such that the anvil could move from a crushing position to a non-crushing position, which allows for crushing and splitting of the pill, respectively.

14 Claims, 7 Drawing Sheets

(56) References Cited

U.S. PATENT DOCUMENTS

| | | | |
|---|---|---|---|
| 2007/0164141 | A1 | 7/2007 | Engel et al. |
| 2007/0228053 | A1 | 10/2007 | Darst |
| 2007/0297701 | A1 | 12/2007 | Engel et al. |
| 2008/0061175 | A1 | 3/2008 | Engel et al. |
| 2008/0078797 | A1 | 4/2008 | Frick |

* cited by examiner

SYSTEMS AND METHODS FOR PREPARATION OF MEDICATIONS

This application is a divisional of U.S. patent application Ser. No. 13/554,096 filed Feb. 20, 2012. This and all other extrinsic materials discussed herein are incorporated by reference in their entirety.

FIELD OF THE INVENTION

The field of the invention is dividing a pill by cutting and/or slicing.

BACKGROUND

The following background discussion includes information that may be useful in understanding the present invention. It is not an admission that any of the information provided herein is prior art or relevant to the presently claimed invention, or that any publication specifically or implicitly referenced is prior art.

Pills and tablets are often a standard form of delivery for many medications and vitamins to users. These pills and tablets can come in different shapes and sizes. For example, pills and tablets could have a round, capsule, oblong, rectangle, or heart shape. Often times, consuming the pill can be problematic due to its size and shape. In addition, it can be difficult to split a pill in half, such as to reduce a dose of a medication.

In an effort to reduce the problems with administering certain pills, various pill cutters are known in the art. For example, U.S. Pat. No. 7,243,826 to Darst discusses a pull splitter having a blade guard that retracts when the device is closed. Although the device could include a pill crusher compartment that utilizes a portion of dead space within the device, such compartment is located in a separate portion of the device, adding unnecessary complexity to the device. In addition, the device fails to allow for quick replacement of the blade or crusher.

Another version of a pill splitter is discussed in U.S. Pat. No. 5,118,021 to Fiocchi. The Fiocchi pill splitter is capable of pill splitting and pulverizing. A pill is split by a hinged top with a blade when the cap is moved to a closed position. Although the device can be adapted to be used with a mortar to thereby pulverize a pill, the device also requires a separate compartment for pulverizing the pill and additional equipment, which can be undesirable.

In yet another example, U.S. Pat. No. 7,252,254 to Engel et al. describes a device that crushes and splits pills. However, like the preceding devices, the Engel device also splits and crushes pills in separate areas of the device.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for simplified devices and methods for crushing and splitting pills in a single area of the device.

SUMMARY OF THE INVENTION

The inventive subject matter provides apparatus, systems and methods in which a pill could be divided by splitting and/or crushing. In contemplated embodiments, a pill splitter and crusher device can be configured to operate on a pill, such as by splitting or crushing the pill. Preferred devices includes a first member rotatably coupled with a second member. The first member can include a pill-receiving cavity and the second member preferably comprises a blade and an anvil. The blade is generally configured to split a pill placed within the pill-receiving cavity.

The anvil is preferably disposed within the device such that the anvil can crush a pill placed within the pill-receiving cavity when desired. In especially preferred embodiments, the anvil can be coupled to the second member, such that the anvil can be repositioned from a crushing first position and a non-crushing second position with respect to the second member. As alluded to above, in the first position, the anvil can be disposed such that it at least partially surrounds or covers the blade, which allows the pill to be crushed using the anvil or a combination of the anvil and blade. In the second position, the anvil is preferably disposed away from the blade, such that a pill placed within the pill-receiving cavity can be split by the blade.

In another aspect of the inventive subject matter, methods are contemplated for preparing medication for consumption by a human or pet, for example, where a pill dividing device is provided. Preferably, the pill dividing device has a first and second member that are rotatably coupled with respect to one another. The first member can include a pill-receiving cavity and the second member can include an anvil and a cutting member such as a blade, which can be used to operate on the pill.

It is contemplated that a user can be instructed to divide the pill by moving the device to a closed position. To allow for the user to choose between splitting and crushing the pill, the anvil can advantageously be configured to reposition from a crushing first position to a non-crushing second position. It is further contemplated that a plurality of pouches could be provided, each having an inside surface area of no more than two $in^2$ ($12.9\ cm^2$) that can receive at least one pill. To reduce potential clean-up of the device, by placing the pill within a pouch prior to dividing the pill, a user could be instructed to insert a pouch that contains one or more pills into the pill dividing device to thereby divide the one or more pills.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
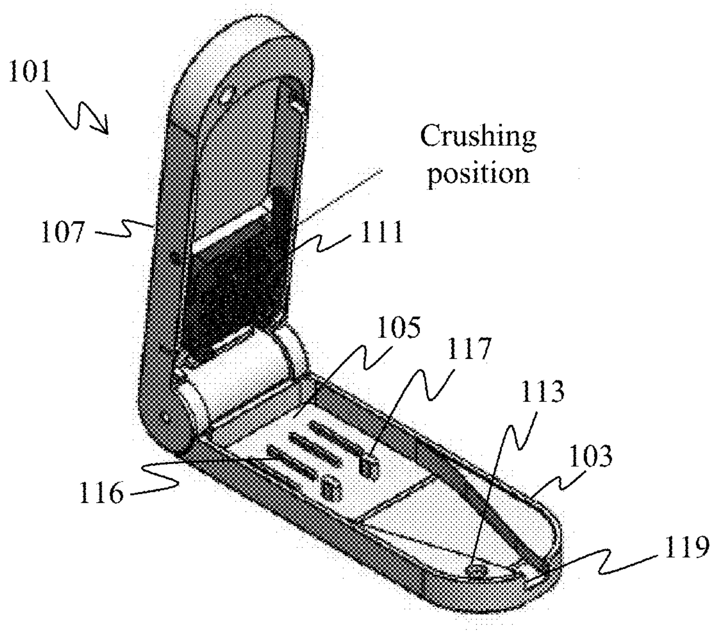
FIG. 1A is a perspective view of an embodiment of a pill splitter and crusher in a crushing position.
Figure 1B:
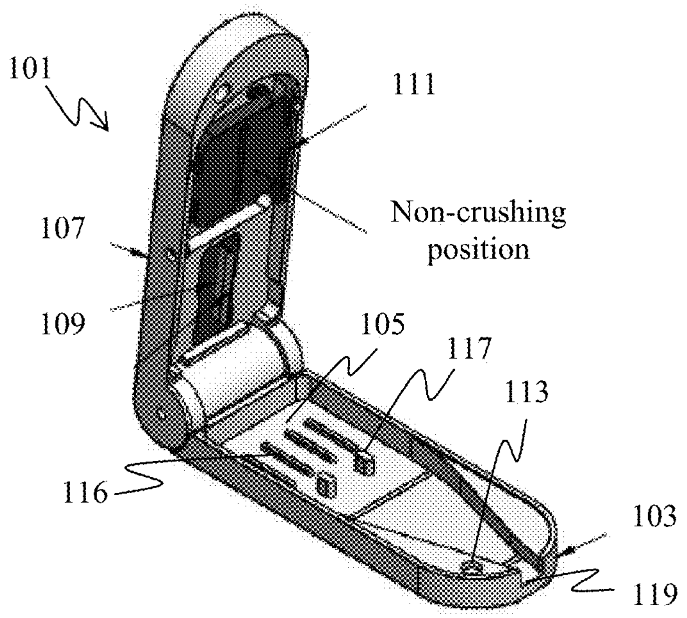
FIG. 1B is a perspective view of the pill splitter and crusher shown in FIG. 1A in a non-crushing position.

Generally, a pill splitter and crusher device is disclosed, whereby the pill splitter and crusher device can be used to operate on a pill. In FIGS. 1A-1B, an exemplary embodiment of a pill splitter and crusher device 101 is illustrated. In this embodiment, the pill splitter and crusher 101 can include a first member 103 with a pill-receiving cavity 105, and a second member 107 comprising a blade 109 and an anvil 111. Typically, the blade 109 and anvil 111 are disposed within the device 101 such that the blade 109 can split a pill within the cavity 105 and the anvil can crush a pill within the cavity 105 by closing the device 101. As used herein, the term "pill" includes tablets, capsules, and other edible, ingestible, and digestible containers capable of being crushed or split. The pill may include drugs, herbs, supplements or other orally-ingestible compounds. Preferred devices are handheld, such that they can be placed in a palm of a user's hand, and preferably have a length of between 7 cm to 12 cm, a width of between 2 cm to 5 cm, and a height of between 1 cm-3 cm. Of course, the specific dimensions of the device can be varied to larger or smaller dimensions, as necessary, for the specific application.

Preferably, the anvil 111 can be coupled to the second member 107, such that the anvil 111 can be repositioned from a crushing first position, such as that illustrated in FIG. 1A, to a non-crushing second position, such as that illustrated in FIG. 1B. In the crushing position, the anvil 111 is preferably disposed within the second member 107 such that the anvil 111 at least partially surrounds or covers blade 109 and can crush a pill placed within the pill-receiving cavity 105 of the first member 103 by closing device 101. In the non-crushing second position, the anvil 111 can advantageously be moved away from the blade 109, such that blade 109 is exposed and can split a pill placed within the pill-receiving cavity 105 when the device is closed. In addition, a pouch could be used in conjunction with the pill splitter and crusher 101, such that the pouch could receive a pill to be crushed or split within the pill-receiving cavity 105.

In some contemplated embodiments, the anvil 111 can comprise of a pattern of raised elements on its face. For instance, the anvil's face could be exposed when the anvil 111 is in a crushing first position and covered when the anvil 111 is in the non-crushing second position. Considering the illustrations in FIGS. 1A-1B, the anvil 111 could have a face comprising a plurality of bumps that are exposed when the anvil 111 is in the crushing first position (FIG. 1A) and a flat back surface when in the non-crushing second position (FIG. 1B). It is further contemplated that the anvil 111 could comprise the same material as at least one of the pill-receiving cavity 105, first member 103, and the second member 107. However, it is alternatively contemplated that the anvil 111 could comprise of some other commercially suitable material and/or shape if desired.

As shown in FIG. 1, the anvil 111 can be used to at least partially surround a blade 109 when the anvil is in the crushing position. One manner of partially surrounding the blade 109 is by the use of a slot within the anvil 111, wherein the slot is sized and dimensioned to receive the blade 109. Preferably, the anvil 111 height is greater than the blade 109, such that the anvil 111 can crush the pill when the anvil 111 is in the crushing first position. However, it is contemplated that the height of the blade 109 could be greater than the height of the anvil 111 if it is desired to do so.

The first member 103 and the second member 107 preferably comprise a zinc alloy, but could be composed of anodized aluminum or other metals or metal composites, plastics or other polycarbonates, or any other commercially suitable material(s) or combinations thereof. Although the first and second member 103 and 107 preferably comprise the same shape, it is alternatively contemplated that one or both of the first and second members 103 and 107 could be of different shapes, such as rectangular, circular, and triangular, for example.

Figure 2:
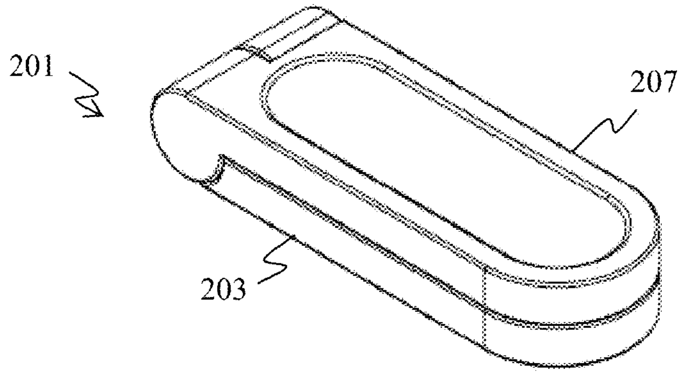
FIG. 2 is a perspective view of an exemplary embodiment of a pill splitter and crusher in a closed position.

In preferred embodiments, the first member 103 can be rotatably coupled to the second member 107. However, it is alternatively contemplated that the first member 103 could be pivotally or slidably coupled to the second member 107. The first and second members could be coupled using male and female hinges, which are preferably made of a metal (e.g., aluminum) or metal composite, although any commercially suitable material could be used. When coupled, the pill splitter and crusher 101 can be opened such as that shown in FIG. 1, and closed such as that shown in FIG. 2. With respect to the remaining numerals in FIG. 2, the same considerations for like components with like numerals of FIG. 1B apply.

The pill-receiving cavity 105 is preferably sized and dimensioned to receive one or more pills, such that the one or more pills can be split, crushed, or otherwise divided when the device 101 is moved to a closed position. To help maintain an orientation and facilitate dividing of the one or more pills within the cavity 105, it is contemplated that the cavity 105 can include a set of protrusions 116 or raised elements. Although the protrusions 116 are shown as a set of parallel raised lines, other patterns of protrusions are contemplated including, for example, a set of intersecting lines or a surface having a higher co-efficient of friction than that of the first member 103. The first member 103 can further include a second set of protrusions 117 that are sized and dimensioned to maintain the one or more pills within the pill-receiving cavity 105. Although the second set of protrusions are shown as including two raised elements, it is contemplated that the set could include a single protrusion or three or more protrusions as needed.

It is further contemplated that the pill-receiving cavity 105 could be lined with a material that is different from that of the first member 103 and/or second member 107. For example, the pill-receiving cavity 105 could comprise an FDA-approved material or some other desired material. Similarly, the anvil 111 and blade 109 could be a part of an inner lining of the first member 107. In such embodiments, the blade 109 and the anvil 111 could be removably and individually coupled to the second member 107 (i.e., the blade and the anvil are replaceable) or the entire inner lining containing the blade 109 and the anvil 111 could be replaced.

In another embodiment, one or both of the pill splitter and crusher 101 can include a magnetic fastener 113 that maintains the pill splitter and crusher 101 while in a closed position. This may be favorable when traveling with the pill splitter and crusher 101. In such embodiment, it is contemplated that the strength of the magnetic fastener 113 should be sufficient enough to maintain the pill splitter and crusher 101 in a closed position, but not strong enough where opening the pill splitter and crusher 101 requires an excessive amount of force. It is contemplated that other closing mechanisms could be used to maintain the pill splitter and crusher 101 in a closed position, such as a fastener or a clicking or locking mechanism.

In further aspects of the inventive subject matter, the first member 103 could comprise of a funnel region 119. Having a funnel region 119 allows a user to funnel out the crushed or split remains of the pill from the pill splitter and crusher 101.

Figure 3:
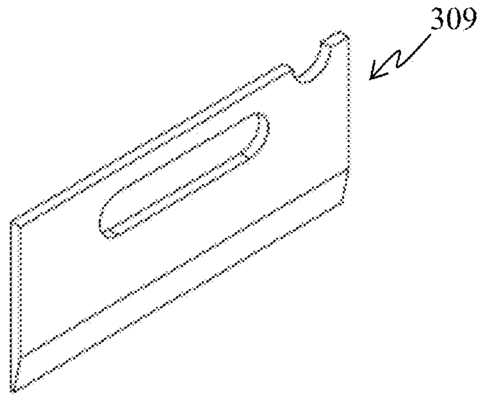
FIG. 3 is a perspective view of an exemplary embodiment of a blade for splitting a pill.

FIG. 3 illustrates an exemplary embodiment of a blade 309 configured to be used in a pill splitter and crusher 101. Although the blade 309 is shown as rectangular in shape with a straight cutting edge, it is contemplated that the shape of the blade and the cutting surface could vary in geometry depending on the specific application. Furthermore, the blade could be made of a metal (e.g., stainless steel), ceramic, or plastic as long as the material is hard enough to split a pill.

Figure 4A:
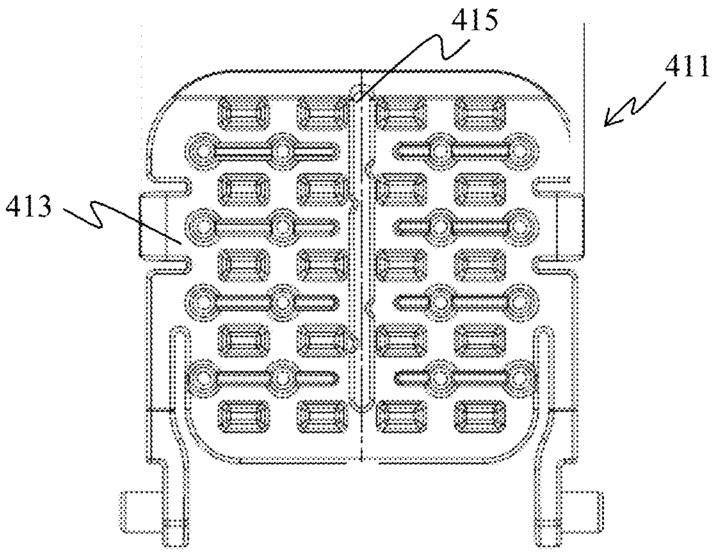
FIGS. 4A-4B are front and side perspective views of an exemplary embodiment of an anvil for crushing a pill.
Figure 4B:
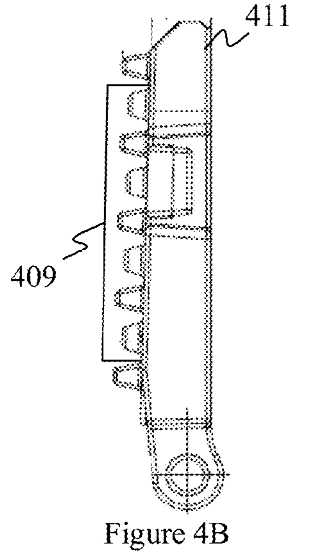

FIGS. 4A-4B illustrate an exemplary embodiment of an anvil 411 for use in a pill cutting and crushing device. As shown in FIGS. 4A-4B, the anvil 411 can have a crushing surface 413 that can be used to crush a pill. The crushing surface 413 could comprise pattern of raised elements or protrusion that facilitate crushing of a pill by the anvil 411. The raised elements or protrusions could be at a uniform height or at varying height. Moreover, the raised elements or protrusions could comprise of the same geometry or varying geometry. For example, the raised elements or protrusions could comprise of rectangles, cylinders, triangles, or some other shape that would allow crushing of a pill. Finally, the design of the crushing surface 413 could vary with respect to the level of crushing desired, such that finer particles could be achieved using one crushing surface 413 and coarse particles could be achieved using another. Such designs with respect to crush grain quality could be combined within the same anvil 411.

As discussed earlier, the anvil 411 could be used to at partially surround a blade 409 when the anvil is in the crushing position. In such contemplated embodiments, the anvil 411 can advantageously include a slot 415 configured to receive a blade 409 such as shown in FIG. 4B. Preferably, the anvil 411 has a height greater than that of the blade such that the anvil 411 acts as a blade guard when the blade is not in use. However, it is alternatively contemplated that blade 409 can have a height greater than that of the anvil 411 such as shown in FIG. 4B. In such embodiments, both the anvil 411 and blade 409 can contact a pill. With respect to the remaining numerals in each of FIGS. 4A-4B, the same considerations for like components with like numerals of FIG. 1B apply.

Figure 5:
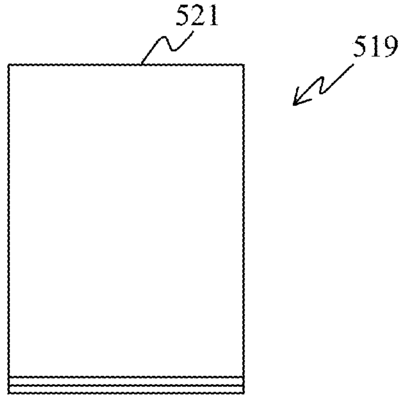
FIG. 5 is a top perspective view of an exemplary pouch.

FIG. 5 illustrates one embodiment of a pouch 519 that can be used with a pill crusher and splitter device. Preferably, the pouch can be manufactured a polymer (e.g., a linear low density polyethylene clear bag) and is approved by the U.S. Food and Drug Administration and/or the United States Department of Agriculture. The pouch 519 can be configured to receive one or more pills and could be sized and dimensioned to fit within a pill-receiving cavity such as that shown in FIG. 1B. Although shown having a rectangular cross-section, it is alternatively contemplated that the pouch 519 could have any commercially suitable shape. While preferred pouches comprise a single open end 521, it is contemplated that the pouch could alternatively comprise two flaps that are connected and configured to overlap to allow for easier access to medication within the pouch. With respect to the remaining numerals in FIG. 5, the same considerations for like components with like numerals of FIG. 1B apply.

Figure 6:
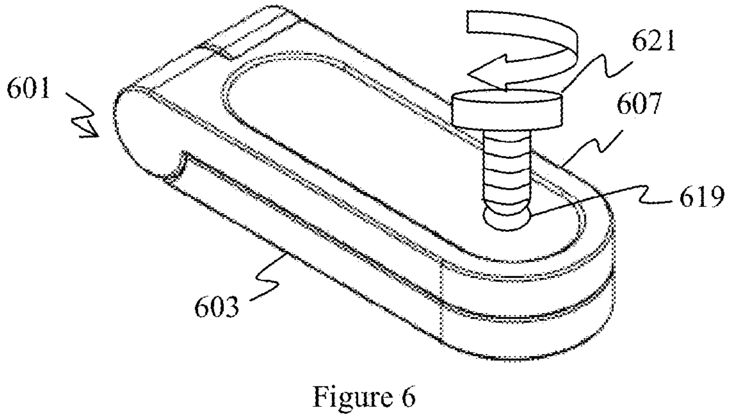
FIG. 6 is a perspective view of another embodiment of a pill splitter and crusher having threads configured to receive a screw.

In FIG. 6, an exemplary embodiment of a pill splitter and crusher device 601 is illustrated, wherein a first member 603 and a second member 607 each comprises a threaded aperture 619 configured to receive a screw 621 or other fastener. By rotating the screw 621 or other fastener, closure of the device 601 and crushing and/or splitting of a pill within the device 601 can be facilitated. With respect to the remaining numerals in FIG. 6, the same considerations for like components with like numerals of FIG. 1B apply.

Figure 7:
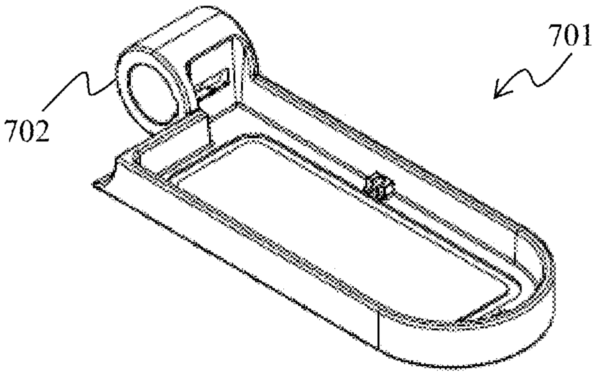
FIG. 7 is a perspective view of one embodiment of a member of a pill splitter and crusher.

In FIG. 7, it is contemplated that the first member and the second member of the pill splitter and crusher devices described above could comprise an identical housing 701, which advantageously reduces manufacturing costs. In such embodiments, the housings of each of the first and second members are preferably configured to receive a removable lining, such as those shown in FIG. 8A or 9A, which thereby allows the functionality of the device to be modified. The removable lining could comprise a pill-receiving cavity or an anvil and blade, for example, and can preferably couple to housing 701 via a snap-fit, although any commercially suitable fastener(s) could be used. In this manner, the lining is easily removable and replaceable as necessary, such as to replace a dull blade or modify the functionality of the device. In further embodiments, the identical components could be coupled to other removable pieces for additional functionality. With respect to the remaining numerals in FIG. 7, the same considerations for like components with like numerals of FIG. 1B apply.

Figure 8A:
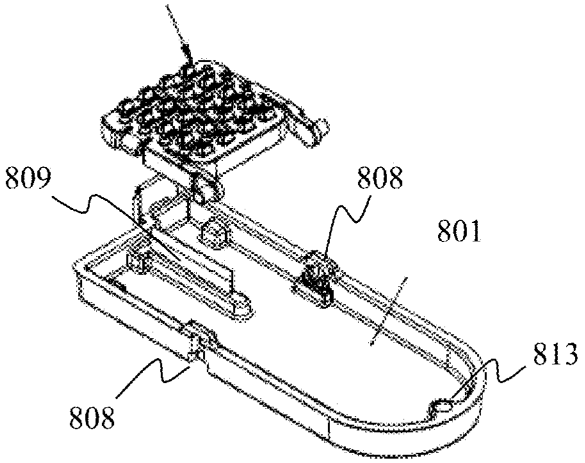
FIGS. 8A-8B are a perspective view and a vertical cross-section view, respectively, of an embodiment of an inner lining for a pill splitter and crusher.
Figure 8B:
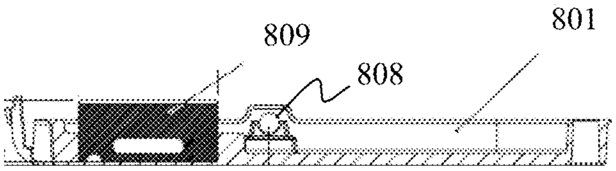

In FIGS. 8A-8B, an inner lining 801 comprising an anvil and blade piece is shown that can be coupled to a first member and/or second member. As illustrated, anvil 811 is removably coupled to the disposable lining 801, such that the anvil 811 could be individually replaced. It is contemplated that blade 809 can also be individually replaced if needed, for example, when the blade becomes dull. However, in preferred embodiments the blade is integral with the lining 801, which itself can be removed from the device and replaced as needed. However, one should note that the inner lining 801 can also be replaced by simply removing it from the first and/or second member. With respect to the remaining numerals in FIG. 8A-8B, the same considerations for like components with like numerals of FIG. 1B apply.

Figure 9A:
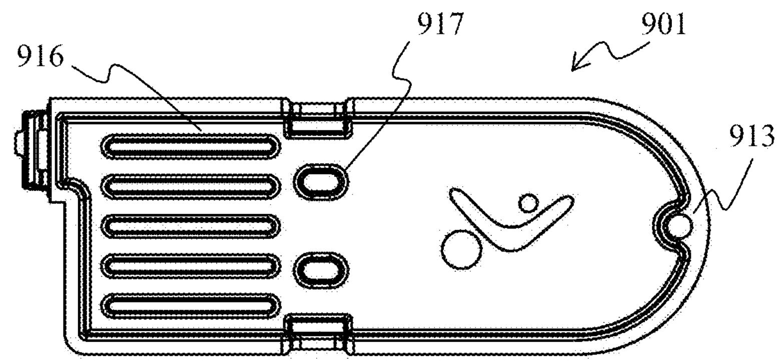
FIGS. 9A-9B are a top view and a vertical cross-section view, respectively, of another embodiment of an inner lining for a pill splitter and crusher.
Figure 9B:
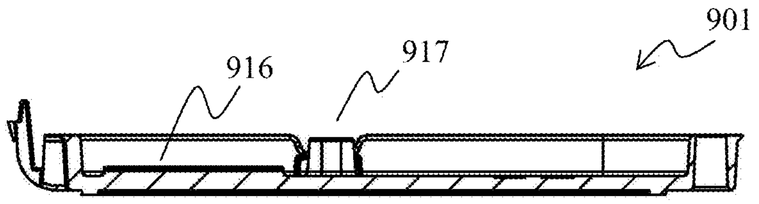

Similar to FIGS. 8A-8B, an inner lining 901 comprising a pill-receiving cavity is shown in FIGS. 9A-9B. The lining 901 can also be removably coupled to a first or second member of a pill splitter and crusher device. In such embodiments, a user can replace the pill-receiving cavity as needed, as compared with buying a new pill splitting and crushing device. With respect to the remaining numerals in FIGS. 9A-9B, the same considerations for like components with like numerals of FIG. 1B apply.

Figure 10:
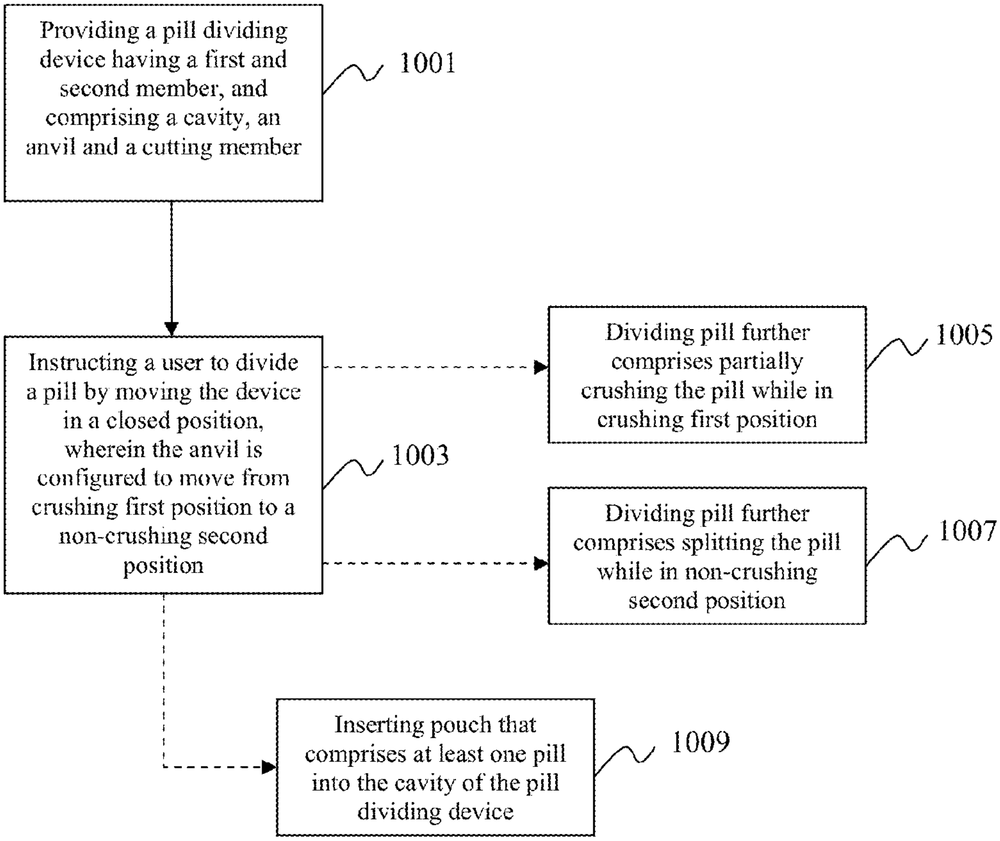
FIG. 10 is a flow chart of an exemplary method of preparing medications using a pill dividing device.

In another aspect, a method of preparing medication is illustrated in FIG. 10. A pill dividing device is provided 1001, wherein the device has a first and second member that are rotatably coupled. Moreover, the first member comprises a cavity and the second member comprises an anvil and a cutting member. In preferred embodiments, the cavity could receive pills and the cutting member can be a blade. Furthermore, a user is instructed 1003 to divide a pill by moving the device into a closed position. It is contemplated that the anvil is configured to move from a crushing first position to a non-crushing second position.

It should be appreciated that the exemplary embodiment in FIG. 10 could comprise of a further step of dividing the pill by partially crushing 1005 the pill when the device is moved to the closed position while the anvil is disposed in the crushing first position. Moreover, a user could divide the pill by splitting 1007 the pill when the device is moved to the closed position while the anvil is disposed in the crushing first position. In further contemplated methods, an additional step of inserting 1009 a pouch comprising one pill into the cavity of the pill dividing device could be performed.

Figure 11:
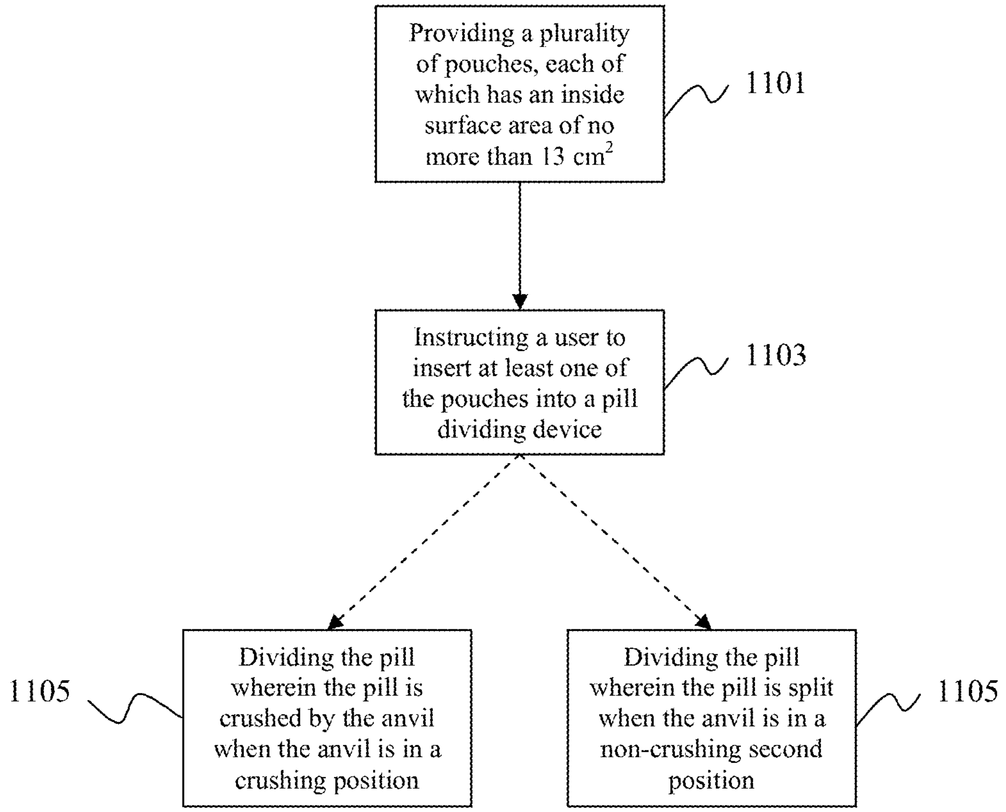
FIG. 11 is a flow chart of an exemplary method of dividing a pill using pouches.

In another aspect, a method of dividing a pill is shown in FIG. 11. A plurality of pouches are provided 1101, wherein the pouches have an inside surface area of no more than 15 $cm^2$. Additionally, a user is instructed 1103 to insert at least one of the pouches into a pill dividing device. In contemplated methods, the pill dividing device comprises an anvil that is configured to move from a crushing first position and a non-crushing second position. Typically, the anvil moves between the crushing first position and non-crushing second position with respect to the device. Furthermore, a pill could be crushed 1105 within the pouch when the anvil is in the crushing first position.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for crushing a pill, comprising:

providing a plurality of pouches, each of which is configured to receive at least one pill;

instructing a user to insert at least one of the pouches into a cavity of a pill dividing device, wherein the device has an anvil configured to move to a crushing first position from a non-crushing second position with respect to the pill dividing device; and instructing the user to move the anvil to the crushing first position.

2. The method of claim 1, wherein the pill dividing device comprises first and second members, and further comprising instructing the user to crush the pill within the pouch when the anvil is in the crushing first position by bringing the first and second members together.

3. The method of claim 1, further comprising instructing a user to insert a pill within at least one of the pouches.

4. A method for dividing a pill, comprising:

providing a plurality of pouches, each of which (1) has an inside surface area of no more than 13 square centimeters and (2) is configured to receive at least one pill; and instructing a user to insert at least one of the pouches into a pill dividing device having a protrusion and an anvil configured to move to from a cutting first position where the anvil is disposed away from the protrusion, from a non-cutting second position where the anvil surrounds the protrusion; and instructing the user to move the anvil to the cutting first position away from the protrusion.

5. The method of claim 4, wherein the pill dividing device comprises first and second members, and further comprising instructing the user to cut the pill within the pouch when the anvil is in the cutting first position by bringing the first and second members together.

6. The method of claim 4, further comprising instructing a user to insert a pill within at least one of the pouches.

7. A method for preparing medication, comprising:

providing a pill dividing and crushing device having a first member that is rotatably coupled to a second member, wherein the first member comprises a cavity and the second member comprises an anvil;

instructing a user to divide a pill by rotating the second member closer to the first member to move the device to a closed position; and wherein the anvil is configured to move within the second member from a crushing first position to a non-crushing second position.

8. The method of claim 7, wherein the pill dividing and crushing device further comprises a cutting member.

9. The method of claim 8, wherein the anvil at least partially surrounds the cutting member in the crushing first position.

10. The method of claim 8, further comprising at least partially crushing the pill by moving the device to the closed position while the anvil is disposed in the crushing first position within the second member.

11. The method of claim 7, further comprising splitting the pill by moving the device to the closed position while the anvil is disposed in the non-crushing second position within the second member.

12. The method of claim 7, further comprising instructing the user to insert a pouch that comprises at least one pill into the cavity of the first member.

13. The device of claim 7, wherein at least one of the first and second members comprises a removable lining.

14. The device of claim 13, wherein the second member comprises the removable lining, and wherein the blade is integral with the removable lining.

* * * * *